United States Patent
Ruggiero (10) Patent No.: US 8,341,128 B1
(45) Date of Patent: Dec. 25, 2012

(54) CONCURRENCY CONTROL USING AN EFFECTIVE CHANGE STACK AND TENANT-BASED ISOLATION

(75) Inventor: Jon Ruggiero, Walnut Creek, CA (US)

(73) Assignee: Workday, Inc., Pleasanton, CA (US)

( * ) Notice: Subject to any disclaimer, the term of this patent is extended or adjusted under 35 U.S.C. 154(b) by 346 days.

(21) Appl. No.: 12/151,961

(22) Filed: May 9, 2008

(51) Int. Cl.
*G06F 7/00* (2006.01)
*G06F 17/00* (2006.01)

(52) U.S. Cl. ........ 707/690; 707/703; 707/704; 707/781; 711/100

(58) Field of Classification Search .................. 707/687, 707/690, 703, 704, 781; 711/100
See application file for complete search history.

(56) References Cited

U.S. PATENT DOCUMENTS

| | | | |
|---|---|---|---|
| 5,615,373 A * | 3/1997 | Ho ................................ 710/200 |
| 5,668,958 A * | 9/1997 | Bendert et al. ................ 710/305 |
| 5,870,761 A * | 2/1999 | Demers et al. ......... 707/999.001 |
| 6,178,440 B1 * | 1/2001 | Foster et al. ................... 709/201 |
| 6,571,259 B1 * | 5/2003 | Zheng et al. ........... 707/999.202 |
| 6,631,374 B1 * | 10/2003 | Klein et al. .................... 707/638 |
| 6,636,851 B1 * | 10/2003 | Bamford et al. ....... 707/999.008 |
| 7,233,947 B2 * | 6/2007 | Lomet ........................... 707/703 |
| 7,324,995 B2 * | 1/2008 | Findleton et al. ...... 707/999.008 |
| 7,707,195 B2 * | 4/2010 | Nettleton et al. .............. 707/704 |
| 7,831,642 B1 * | 11/2010 | Kumaresan et al. ........... 707/822 |
| 2005/0066095 A1 * | 3/2005 | Mullick et al. ................ 710/200 |
| 2008/0133563 A1 * | 6/2008 | Hironiwa ....................... 707/101 |
| 2009/0037494 A1 * | 2/2009 | Wong et al. .................... 707/202 |

* cited by examiner

*Primary Examiner* — Hares Jami
(74) *Attorney, Agent, or Firm* — Van Pelt, Yi & James LLP (57) ABSTRACT

Transaction processing is disclosed. A first transaction associated with a first system tenant is received. The first transaction is associated with a transaction effective time. It is determined whether the first transaction modifies data. In the event that the first transaction modifies data, it is determined whether a second transaction is executing that modifies data associated with the first system tenant. In the event that there is not a second transaction executing, the first transaction is executed with respect to the transaction effective time.

25 Claims, 7 Drawing Sheets

CONCURRENCY CONTROL USING AN EFFECTIVE CHANGE STACK AND TENANT-BASED ISOLATION

BACKGROUND OF THE INVENTION

Databases often contain large numbers of vitally important records for a company. These records can include human resource, corporate, financial, legal, medical, and other records. During the course of business, database users need to access the database to read or modify records. In a company with many database users, it may be a regular occurrence for multiple database users to access the database at the same time. If multiple database transactions occur concurrently, the database must be designed such that each database user has a consistent view of the database during their transaction and that the final status of the database is the same as if the transactions had occurred one after the other. Two typical ways of accomplishing these goals are 1) by preventing database users from accessing the same parts of the database at the same time, and 2) by keeping separate versions of a file for each database user acting on it concurrently and constructing the final version of the file when all of the concurrent transactions are completed. The first way leads to only limited concurrency and wastes users' time waiting for other transactions to complete, whereas the second way leads to the technically complicated process of constructing a file from several concurrently modified versions.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a non-transitory computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Concurrency control using an effective change stack and tenant-based isolation is disclosed. An object-based database system stores data as a large hierarchical network of objects. Each object may contain attributes associated with it, methods for operating on the object, and relations to other objects. When a modification is made to an object, a new effective change object is created, storing the differences between the previous version of the object and the modified version. The effective change object is added to the effective change stack associated with the object. The effective change stack for a given object stores the entire history of modifications of that object, and can be used to retrieve the state of the object for any arbitrary time. The network of objects is broken into multiple parts, each part for a separate group of users. The groups of users are known as tenants, and are typically separate companies utilizing a common database hosted at a central site. Each user is associated with a single system tenant, and each piece of data in the database is associated with a single system tenant. No data is shared between tenants, and tenants are prevented from interacting with each other's data in any way. Tenant isolation allows instructions associated with different tenants to be executed concurrently with no danger of collision, allowing faster execution on systems with multiple tenants and scalability to systems with large numbers of tenants.

Concurrency control is implemented by utilizing the effective change stack to efficiently maintain isolation between separate transactions within a tenant, and tenancy to separate disparate parts of the database. A transaction is any operation of the database system that accesses data from the database. A transaction may read data, write data, or do both. Transactions have an associated effective time, which represents the time at which their actions effectively take place, even if different from the current time. When a read-only transaction begins, its effective time is set to the current time, and the state of all objects the transaction reads is referred to that effective time. If the effective time is no longer the current time (e.g., time has passed), the transaction is able to read data as it was at the effective time by utilizing the effective change stack. Any object modifications occurring after the effective time are invisible to the transaction; a write transaction that changes the data that is requested to be read by the read-only transaction will not affect the read-only transaction (i.e., the changes will not been seen) whose effective time is prior to the write transaction's effective time. There is no limit to the number of read-only transactions that may be occurring concurrently.

Write transactions, however, are limited. In some embodiments, only one transaction per tenant that involves a write operation is occurring at once. When a transaction involving a write operation begins, its effective time is set to the current time, and it is designated as the only transaction involving a write operation that may be executing for the tenant associated with the transaction. After the transaction performs a write operation, its effective time is updated to the current time, so that it can see the modification it just performed. If a second transaction for the same tenant involving writing begins while the first transaction is still executing, the system determines that there is already a transaction executing for that tenant involving writing, and the second transaction is forced to wait for the first transaction to complete before it can continue execution. When the first transaction involving a write completes, the second transaction is then allowed to continue execution. In various embodiments, there is a queue or a prioritized queue for transactions that are awaiting completion of the execution of a transaction involving writing for a given tenant or any other appropriate mechanism for causing transactions to hold for executing. In some embodiments, more than one transaction per tenant that involves a write operation are able to occur concurrently as long as the write operations that are occurring concurrently write to different stored data. A check is performed to ensure that the stored data that is written to by a write operation of a first transaction associated with a given tenant is not also being written to by a second transaction associate with the given tenant. In the event that there is another transaction that is currently running that writes to the stored data, the transaction is forced to wait until the other transaction(s) complete(s).

Figure 1:
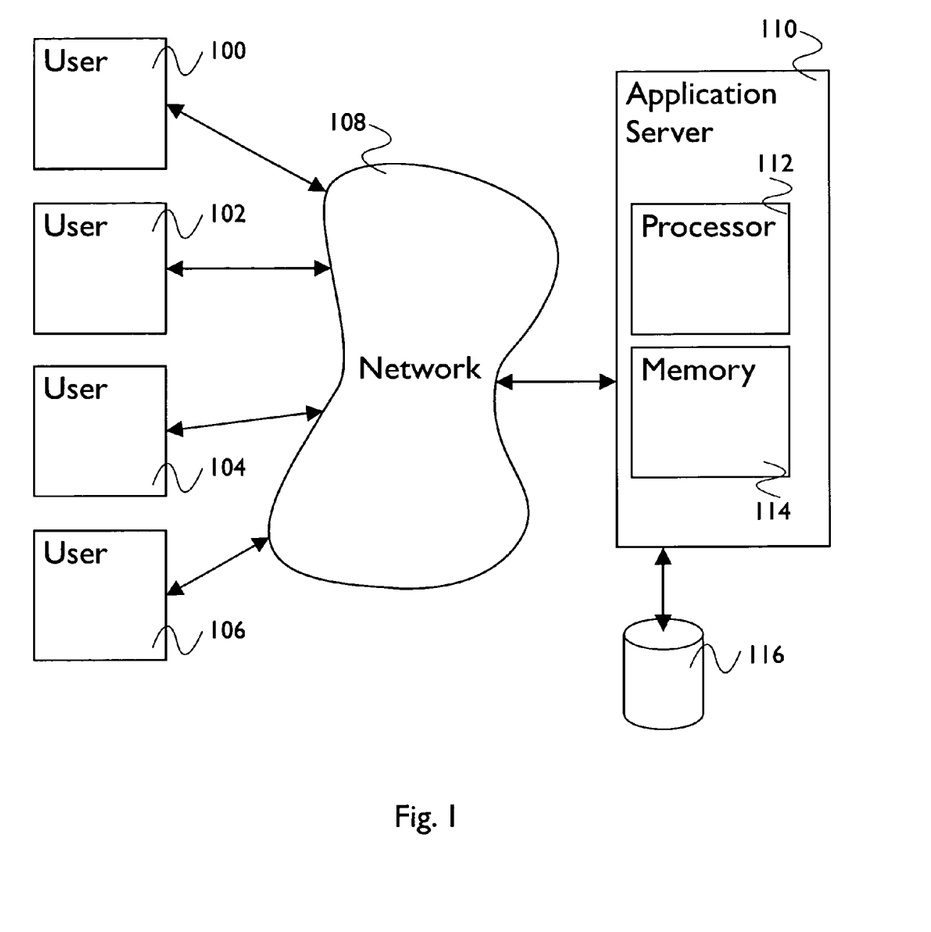
FIG. 1 is a block diagram illustrating an embodiment of a database system with concurrency control.

FIG. 1 is a block diagram illustrating an embodiment of a database system with concurrency control. In the example shown, application server 110 includes processor 112 and memory 114. Application server 110 is coupled to external storage 116 so that application server 110 is able to store information to and access information from external storage 116. Application server 110 is also coupled to network 108. In various embodiments, network 108 comprises one or more of the following: a local area network, a wide area network, a wired network, a wireless network, the Internet, or any other appropriate network. Network 108 enables users 100, 102, 104, and 106 to access application server 104. In various embodiments, users 100, 102, 104, and 106 may be part of the same organization or different organizations, and may be at the same location or at physically remote locations. In some embodiments, data stored in external storage 116 is partitioned into sections corresponding to different organizations (e.g., associated with different tenants), and application server 110 ensures that users may only access data for their organization. In various embodiments, stored data is related to a business requirement such as an expense report, a personnel file, data related to an employee, a record (e.g., human resource, corporate, financial, legal, medical, or other records), or any other relevant data. In various embodiments, the application server comprises a human resource system, payroll system, financial system, supply chain management system, customer relation management system, content management system, business system, or any other appropriate enterprise system.

Figure 2:
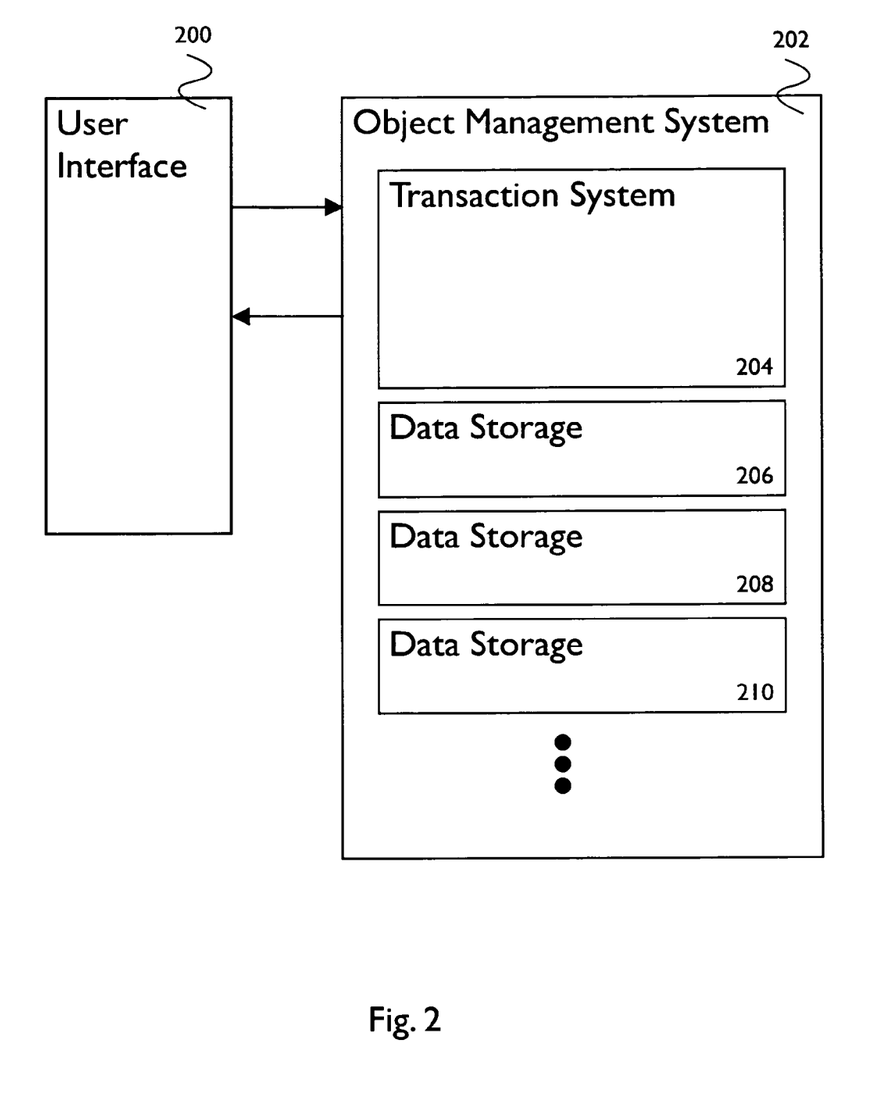
FIG. 2 is a block diagram illustrating an embodiment of a database system with tenancy.

FIG. 2 is a block diagram illustrating an embodiment of a database system with tenancy. In the example shown, a database user (e.g., a user such as user 100 of FIG. 1) interacts with user interface 200, providing input to and receiving output from an application server. Object management system 202 is part of an application running on an application server (e.g., application server such as application server 110 of FIG. 1) and stores data in an external storage (e.g. external storage 116 of FIG. 1). User interface 200 communicates with object management system 202 through a network (e.g., a network such as network 108 of FIG. 1). Transaction system 204 is part of object management system 202. Transaction system 204 receives transaction requests from user interface 200, processes transaction requests, and delivers transaction results to user interface 200. In some embodiments, processing transaction requests includes interacting with (e.g. reading from or writing to) stored data. In the example shown, stored data is broken into a plurality of data storage sections represented in FIG. 2 by storage section 206, data storage section 208, and data storage section 210. An organization associated with a given data storage section is referred to as its tenant. In some embodiments, all database users are associated with a single system tenant. In some embodiments, the database system comprises a plurality of system tenants, each of which has associated database users. In some embodiments, each piece of data in the database is associated with only one of the one or more system tenants. In some embodiments, a database user associated with a tenant is prevented from accessing data associated with other tenants.

Figure 3:
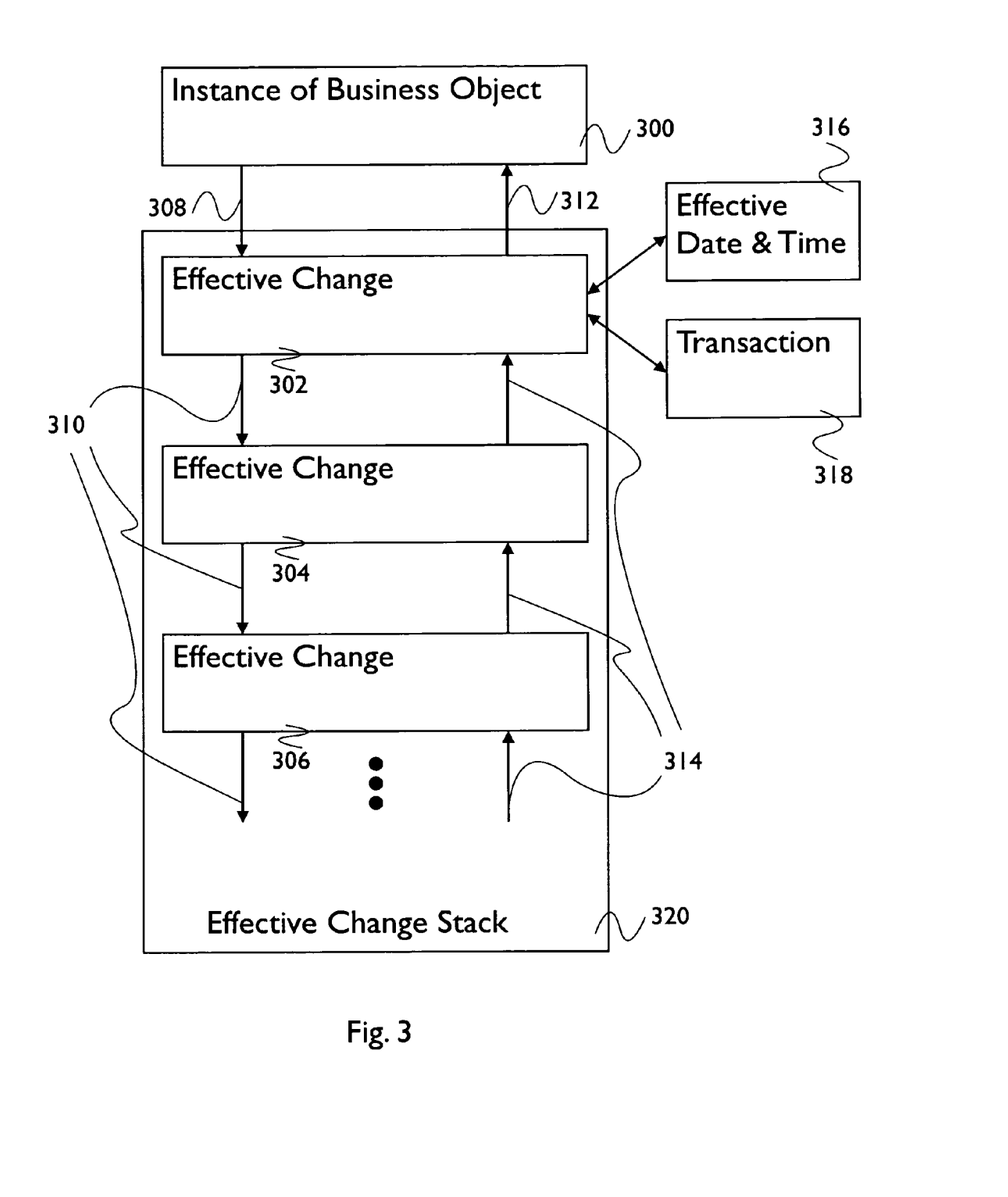
FIG. 3 is a block diagram illustrating an embodiment of objects used to enable non-destructive data storage.

FIG. 3 is a block diagram illustrating an embodiment of objects used to enable non-destructive data storage. In some embodiments, effective change stack 320 records the initial creation of the instance with the state of all attributes and relationships as well as changes to attributes and relationships of the instance of a business object through time. Also, the deletion of an instance is recorded in the effective change stack. In the example shown, instance of business object 300 has relationships 308 and 312 with effective change 302. Relationship 308 refers to the latest effective change for instance of business object 300. Relationship 312 refers to the instance of business object 300 having effective changes as described, for example, by effective change 302. The chain of effective states 320 includes a plurality of linked changes represented in FIG. 3 by effective change 302, which is linked to effective change 304, which in turn is linked to effective state 306, etc.

Effective change 302, effective change 304, and effective change 306 are ordered primarily in descending effective date & time—for example, effective change 302 (top object) is the latest effective change and effective change 306 is an earlier effective change. If effective change objects have the same effective date & time, then the effective change object are ordered in descending transaction date & time. Relations 310 refer to prior effective change objects. Relations 314 refer to next (or later) effective change objects. Each effective change object has relations with an effective data & time object and a transaction object, as represented by effective date & time 316 and transaction 318 with respect to effective change 302 in FIG. 3.

In some embodiments, accessing information regarding a business object by walking a chain of effective states, such as effective change stack 320, enables real-time access (e.g., real-time as opposed to reconstructing the information by replaying a log file) to the state of information as of a time with regard to transaction time, effective time, or both transaction time and effective time. In some embodiments, business object information, including an effective change stack, is contained in memory such as memory 114 of FIG. 1 and/or stored in a data storage repository such as external storage 116 of FIG. 1.

Figure 4:
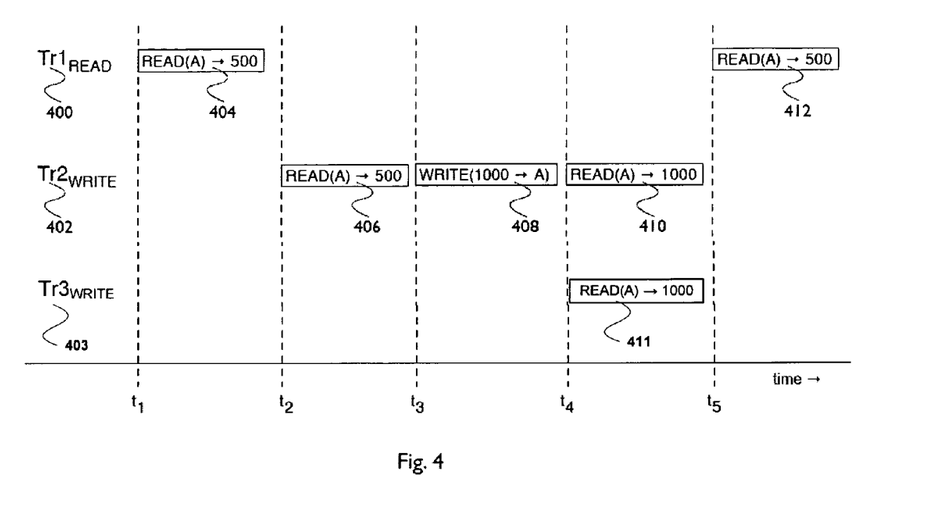
FIG. 4 illustrates a timing diagram obtained in some embodiments of a database system with concurrency control.

FIG. 4 illustrates a timing diagram obtained in some embodiments of a database system with concurrency control. In the example shown, the timing diagram shows operations executed by two transactions executing concurrently. A transaction has an associated effective time and operations executed by the transaction are executed as though they occur at the effective time regardless of the actual current time. For instance, when a data read operation is performed, the data value read is the data value at the transaction effective time, not the data value at the current time. Transaction effective time is first set when the transaction begins executing and is updated only when a transaction performs a write operation. If a transaction only involves read operations, its effective time stays constant for its entire execution time. In some embodiments, a transaction is able to perform a data read operation as though it occurred at an effective time which is not the current time by utilizing an effective change stack (e.g. effective change stack 320 of FIG. 3). In various embodiments, the effective time associated with a transaction comprises a current time, a prior time to the current time, a subsequent time to the current time, or any other appropriate time.

Transaction 400, $Tr1_{READ}$, involves only read operations, and transaction 402, $Tr2_{WRITE}$, involves a write operation. At time $t_1$, transaction $Tr1_{READ}$ begins. Its effective time is set to $t_1$. It then performs operation 404, which reads the value of variable A at its effective time, $t_1$, and returns the value 500. Transaction $Tr2_{WRITE}$ begins at time $t_2$. Its effective time is set to $t_2$. It then performs operation 406, which reads the value of variable A at its effective time, $t_2$, and returns the value 500. At time $t_3$, transaction $Tr2_{WRITE}$ performs operation 408. Operation 408 writes the value 1000 into variable A. The effective time for transaction $Tr2_{WRITE}$ is then updated to the current time $t_3$. It then performs operation 410, which reads the value of variable A at its effective time, $t_3$, and returns the value 1000. At time $t_5$, transaction $Tr1_{READ}$ performs operation 412, which reads the value of variable A at its effective time, $t_1$, and again returns the value 500. Transaction $Tr1_{READ}$ does not see the modification of variable A by transaction $Tr2_{WRITE}$ because it began executing before the modification occurred.

If a third, read-only, transaction 403, $Tr3_{READ}$, begins at time $t_4$ it will have an effective time of $t_4$. Transaction 403 performs operation 411, which reads the value of variable A, it will read the value 1000, the value of variable A at time $t_4$. If transaction $Tr2_{WRITE}$, or any other transaction, makes changes to the value of variable A at a later time, transaction $Tr3_{READ}$ will continue to read the value of variable A as 1000, since its effective time does not change.

Figure 5:
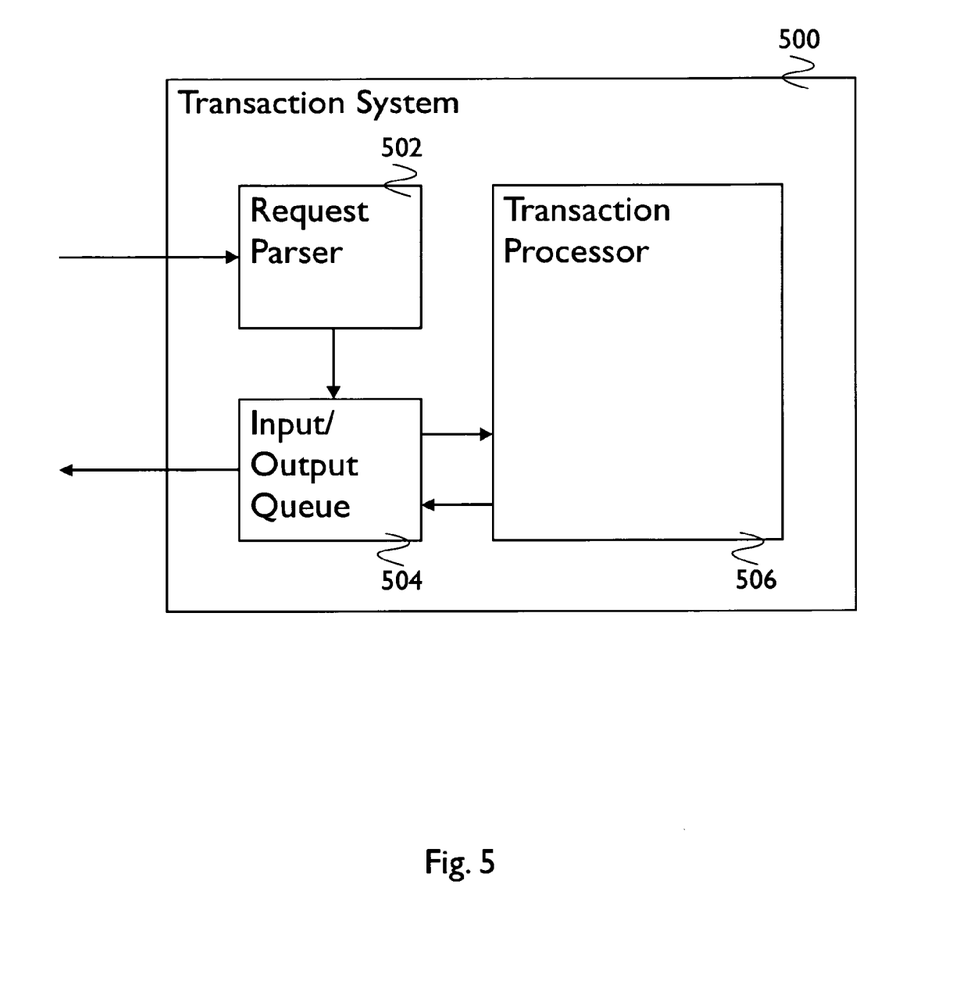
FIG. 5 is a block diagram illustrating an embodiment of a transaction system.

FIG. 5 is a block diagram illustrating an embodiment of a transaction system. In some embodiments the transaction system of FIG. 5 implements transaction system 204 of FIG. 2. In the example shown, object management system 500 comprises a request parser, an input/output queue, and a transaction processor. When a transaction is sent to object management system 500 from a user interface (e.g., a user interface such as user interface 200 of FIG. 2), it is received by request parser 502, which converts the request into a form compatible with transaction processor 506. The transaction is then sent to input/output queue 504, which keeps track of transactions going in and out of transaction processor 506. Input/output queue 504 sends the transaction to transaction processor 506 which processes the transaction. The result of the transaction is then sent back to input/output queue 504, which passes the result back to the user interface.

Figure 6:
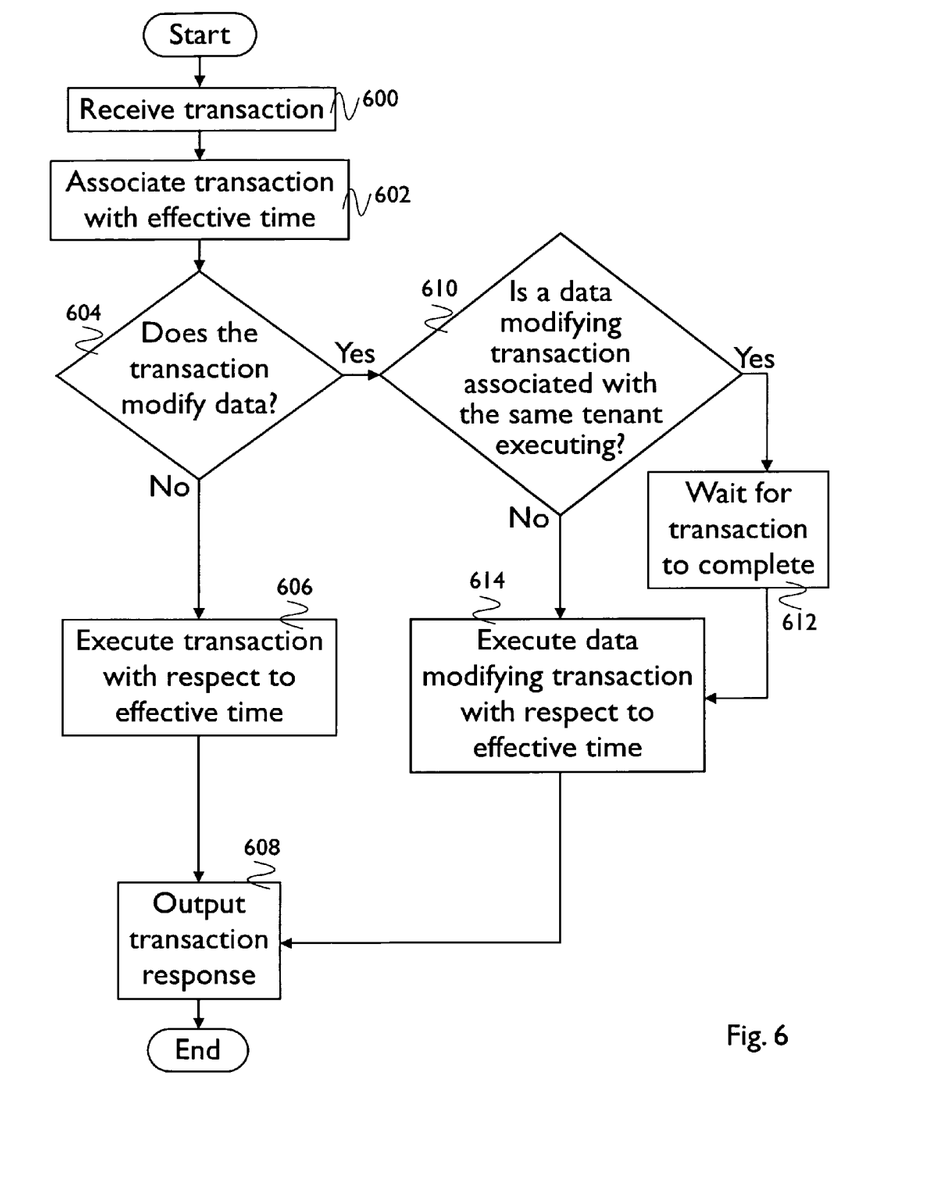
FIG. 6 is a flow diagram illustrating an embodiment of a process for transaction processing.

FIG. 6 is a flow diagram illustrating an embodiment of a process for transaction processing. In some embodiments, the process of FIG. 6 is used by transaction system 500 of FIG. 5 to process transactions. In the example shown, in 600, a transaction is received that is associated with a system tenant. In some embodiments, the tenant is one of a plurality of tenants associated with (e.g., using) the database system. In 602, the transaction is associated with a transaction effective time, which is set to the current time. In some embodiments, operations executed are executed as though they occur at the effective time, regardless of the current time. In the example shown, in 604, the transaction is checked to see if it modifies any data in the database. The processing for a transaction is defined exclusively in metadata, which is interpreted at runtime. This allows for the detection of data modifications at runtime and therefore distinguishes read from write transactions. In some embodiments, the detection of data modifications at run time is used to determine whether a first write transaction and second write transaction both associated with a given tenant write to identical data. If the transaction does not modify data, control passes to 606, where the transaction is executed with respect to the effective time. In 608, the transaction response is output, and the process ends. If the transaction is determined in 604 to modify data, control passes to 610. In 610, the transaction system determines whether a second data modifying transaction associated with the same system tenant is executing. If there is another data modifying transaction associated with the same tenant already executing, control passes to 612, where the transaction processor waits for the transaction already executing to complete. Only one data modifying transaction for a given tenant may be executing at any given time. Once the second transaction completes, or if it is determined in 610 that no other data modifying transaction associated with the same tenant is executing, control passes to 614. In some embodiments, a queue is used for transactions waiting to execute. Multiple data modifying transactions may execute concurrently if and only if they are associated with different system tenants. In the example shown, in 614, the data modifying transaction is executed with respect to the effective time. When the transaction completes, control passes to 608. In 608, the response to the transaction is output from the transaction processor, and the process ends.

In some embodiments, the process of FIG. 6 is modified to allow more than one write transaction to run concurrently for a given tenant as long as the concurrently running write transactions do not write to the same data.

Figure 7:
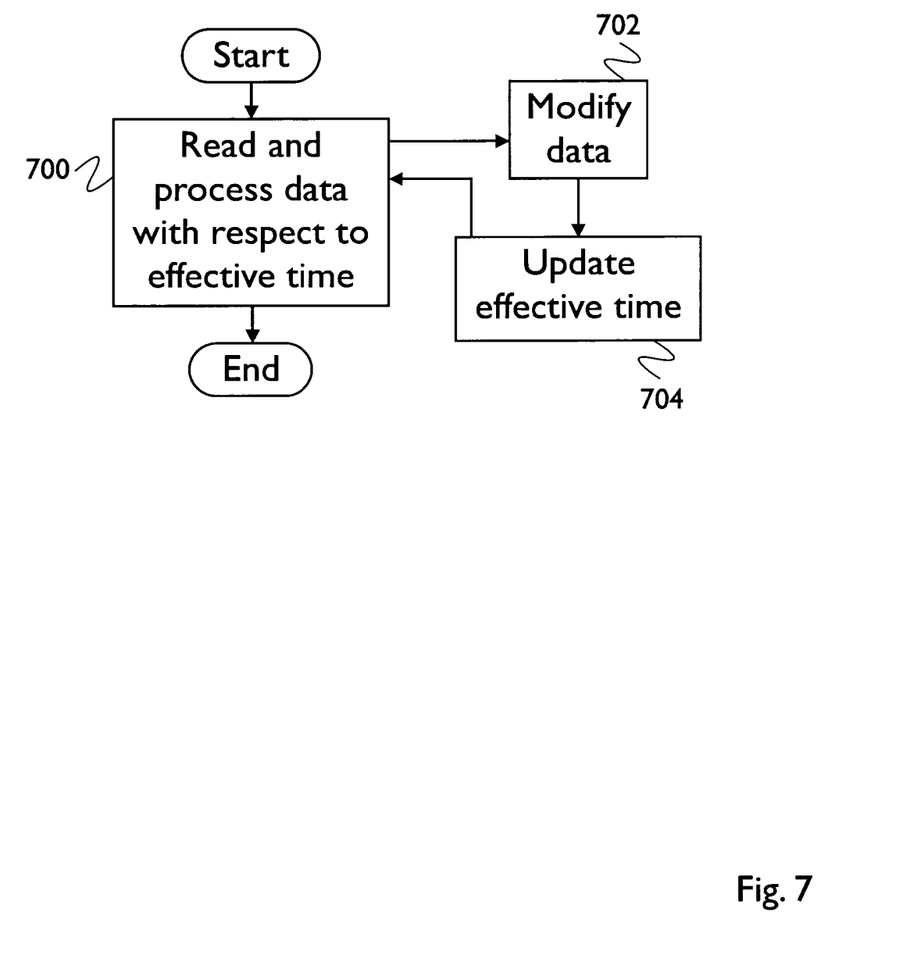
FIG. 7 is a flow diagram illustrating an embodiment of a process for executing a data modifying transaction with respect to the effective time.

FIG. 7 is a flow diagram illustrating an embodiment of a process for executing a data modifying transaction with respect to the effective time. In some embodiments, the process of FIG. 7 is used to implement 614 of FIG. 6. In the example shown, in 700, data is read and processed with respect to the effective time. When the transaction needs to modify data, control passes to 702. In 702, data is modified. In various embodiments, modifying data comprises changing a data entry, creating a data entry, or any other appropriate modification of data in a database. In 704, the transaction effective time is updated to the current time. Control then passes back to 700, where data is read and processed with respect to the effective time. If further data modification is necessary, 702 and 704 are repeated as necessary. When all data access and processing has completed, the process ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A method for transaction processing, comprising:
    receiving a first transaction associated with a first system tenant, wherein the first transaction includes a first transaction effective time and an operation associated with data in a first data state of a plurality of data states stored in an effective change stack associated with the data wherein:

each of the plurality of data states stored in the effective change stack records a modification of the data that is associated with a transaction effective time, wherein recording includes recording initial creation of data with states of attributes and relationships as well as changes to the attributes and relationships of the data through time, wherein the relationship refers to the latest effective change for the data;

ordering the effective changes of data in descending transaction of transaction time if effective changes of data have the same effective time; and the first data state is identified at least in part by the first transaction effective time;

determining, using a processor, whether the first transaction modifies the data, whether a second transaction is executing that modifies the data associated with the first system tenant, and whether the second transaction has a second transaction effective time after the first transaction effective time; and in the event that the first transaction and the second transaction do not both modify the data, executing the first transaction at the fast transaction effective time concurrently with the second transaction, wherein:

in the event that the first transaction does not modify the data, the second transaction modifies the data, and the first transaction effective time is before the second transaction effective time, executing the first transaction with respect to data in the first data state stored in the effective change stack.

2. The method as in claim 1, wherein the first transaction effective time and the second transaction effective time comprise one of the following: a current time, a prior time to the current time, or a subsequent time to the current time.

3. The method as in claim 1, further comprising:

in the event that both the first transaction and the second transaction modify data associated with the first system tenant and the second transaction effective time is before the first transaction effective time, waiting for the second transaction to complete and then executing the first transaction with respect to the first transaction effective time.

4. The method as in claim 3, wherein the first transaction waits for the second transaction to complete in a queue.

5. The method as in claim 1, further comprising:

updating the effective time associated with the first transaction or the second transaction to a current time after a data modification has been performed.

6. The method as in claim 1, wherein all database users are associated with the first system tenant.

7. The method as in claim 1, wherein the first system tenant is one of a plurality of system tenants, each of which has associated database users.

8. The method as in claim 1, wherein the first system tenant is one of one or more system tenants, wherein each piece of data in a database is associated with only one of the one or more system tenants.

9. The method as in claim 1, wherein a database user associated with a second system tenant is prevented from accessing data associated with the first system tenant.

10. A system for transaction processing, comprising:
a processor; and
a memory coupled with the processor, wherein the memory is configured to provide the processor with instructions which when executed cause the processor to:
receive a first transaction associated with a first system tenant, wherein the first transaction includes a first transaction effective time and an operation associated with data in a first data state of a plurality of data states stored in an effective change stack associated with the data wherein:

each of the plurality of data states stored in the effective change stack records a modification of the data that is associated with a transaction effective time, wherein recording includes recording initial creation of data with states of attributes and relationships as well as changes to the attributes and relationships of the data through time, wherein the relationship refers to the latest effective change for the data;

order the effective changes of data in descending transaction of transaction time if effective changes of data have the same effective time; and the first data state is identified at least in part by the first transaction effective time;

determine whether the first transaction modifies the data, whether a second transaction is executing that modifies the data associated with the first system tenant, and whether the second transaction has a second transaction effective time after the first transaction effective time; and in the event that the first transaction and the second transaction do not both modify the data, executing the first transaction at the fast transaction effective time concurrently with the second transaction, wherein:

in the event that the first transaction does not modify the data, the second transaction modifies the data, and the first transaction effective time is before the second transaction effective time, execute the first transaction with respect to data in the first data state stored in the effective change stack.

11. The system as in claim 10, wherein the first transaction effective time and the second transaction effective time comprise one of the following: a current time, a prior time to the current time, or a subsequent time to the current time.

12. The system as in claim 10, further comprising: in the event that both the first transaction and the second transaction modify data associated with the first system tenant and the second transaction effective time is before the first transaction effective time, waiting for the second transaction to complete and then executing the first transaction with respect to the first transaction effective time.

13. The system as in claim 12, wherein the first transaction waits for the second transaction to complete in a queue.

14. The system as in claim 10, further comprising:
updating the effective time associated with the first transaction or the second transaction to a current time after a data modification has been performed.

15. The system as in claim 10, wherein all database users are associated with the first system tenant.

16. The system as in claim 10, wherein the first system tenant is one of a plurality of system tenants, each of which has associated database users.

17. The system as in claim 10, wherein the first system tenant is one of one or more system tenants, wherein each piece of data in the database is associated with only one of the one or more system tenants.

18. The system as in claim 10, wherein a database user associated with a second system tenant is prevented from accessing data associated with the first system tenant.

19. A computer program product for transaction processing, the computer program product being embodied in a non-transitory computer readable medium and comprising computer instructions for:

receiving a first transaction associated with a first system tenant, wherein the first transaction includes a first transaction effective time and an operation associated with data in a first data state of a plurality of data states stored in an effective change stack associated with the data wherein:

each of the plurality of data states stored in the effective change stack records a modification of the data that is associated with a transaction effective time, wherein recording includes recording initial creation of data with states of attributes and relationships as well as changes to the attributes and relationships of the data through time, wherein the relationship refers to the latest effective change for the data;

ordering the effective changes of data in descending transaction of transaction time if effective changes of data have the same effective time; and the first data state is identified at least in part by the first transaction effective time;

determining whether the first transaction modifies the data, whether a second transaction is executing that modifies the data associated with the first system tenant, and whether the second transaction has a second transaction effective time after the first transaction effective time; and in the event that the first transaction and the second transaction do not both modify the data, executing the first transaction at the fast transaction effective time concurrently with the second transaction, wherein:

in the event that the first transaction does not modify the data, the second transaction modifies the data, and the first transaction effective time is before the second transaction effective time, executing the first transaction with respect to data in the first data state stored in the effective change stack.

20. A method for transaction processing, comprising:
receiving a first transaction associated with a first system tenant, wherein the first transaction includes a first transaction effective time and an operation associated with a first data in a first data state of a plurality of data states stored in an effective change stack associated with the data wherein:

each of the plurality of data states stored in the effective change stack records a modification of the data that is associated with a transaction effective time, wherein recording includes recording initial creation of data with states of attributes and relationships as well as changes to the attributes and relationships of the data through time, wherein the relationship refers to the latest effective change for the data;

ordering the effective changes of data in descending transaction of transaction time if effective changes of data have the same effective time; and the first data state is identified at least in part by the lust transaction effective time;

determining, using a processor, whether the first transaction modifies the first data, whether a second transaction is executing that modifies a second data and is associated with a second system tenant and whether the second transaction has a second transaction effective time after the first transaction effective time; and in the event that the first transaction does not modify the data and the second transaction is executing that modifies the second data and is associated with the second system tenant, executing the first transaction with respect to the first data in the first data state stored in the effective change stack concurrently with the second transaction.

21. A system for transaction processing, comprising:
a processor; and
a memory coupled with the processor, wherein the memory is configured to provide the processor with instructions which when executed cause the processor to:

receive a first transaction associated with a first system tenant, wherein the first transaction includes a first transaction effective time and an operation associated with a first data in a first data state of a plurality of data states stored in an effective change stack associated with the data wherein:

each of the plurality of data states stored in the effective change stack records a modification of the data that is associated with a transaction effective time, wherein recording includes recording initial creation of data with states of attributes and relationships as well as changes to the attributes and relationships of the data through time, wherein the relationship refers to the latest effective change for the data;

order the effective changes of data in descending transaction of transaction time if effective changes of data have the same effective time; and the first data state is identified at least in part by the lust transaction effective time;

determine whether the first transaction modifies the first data, whether a second transaction is executing that modifies a second data and is associated with a second system tenant and whether the second transaction has a second transaction effective time after the first transaction effective time; and in the event that the first transaction does not modify the data and the second transaction is executing that modifies the second data and is associated with the second system tenant, execute the first transaction with respect to the first data in the first data state stored in the effective change stack concurrently with the second transaction.

22. A computer program product for transaction processing, the computer program product being embodied in a non-transitory computer readable medium and comprising computer instructions for:

receiving a first transaction associated with a first system tenant, wherein the first transaction includes a first transaction effective time and an operation associated with a first data in a first data state of a plurality of data states stored in an effective change stack associated with the data wherein:

each of the plurality of data states stored in the effective change stack records a modification of the data that is associated with a transaction effective time, wherein recording includes recording initial creation of data with states of attributes and relationships as well as changes to the attributes and relationships of the data through time, wherein the relationship refers to the latest effective change for the data;

ordering the effective changes of data in descending transaction of transaction time if effective changes of data have the same effective time; and the first data state is identified at least in part by the lust transaction effective time;

determining whether the first transaction modifies the first data, whether a second transaction is executing that modifies a second data and is associated with a second system tenant and whether the second transaction has a second transaction effective time after the first transaction effective time; and in the event that the first transaction does not modify the data and the second transaction is executing that modifies the second data and is associated with the second system tenant, executing the first transaction with respect to the first data in the first data state stored in the effective change stack concurrently with the second transaction.

23. A method for transaction processing, comprising:
receiving a first transaction associated with a first system tenant, wherein the first transaction includes a first transaction effective time and a plurality of actions associated with data in a first data state of a plurality of data states stored in an effective change stack associated with the data wherein:
each of the plurality of data states stored in the effective change stack records a modification of the data that is associated with a transaction effective time, wherein recording includes recording initial creation of data with states of attributes and relationships as well as changes to the attributes and relationships of the data through time, wherein the relationship refers to the latest effective change for the data;
ordering the effective changes of data in descending transaction of transaction time if effective changes of data have the same effective time; and
the first data state is identified at least in part by the first transaction effective time;
determining, using a processor, whether the actions of the first transaction modify the data, whether a second transaction is executing that modifies the data associated with the first system tenant, and whether the second transaction has a second transaction effective time after the first transaction effective time; and
in the event that the actions of the first transaction and the second transaction do not both modify the data, executing the actions of the first transaction with respect to the first transaction effective time concurrently with the second transaction, wherein:
in the event that the actions of the first transaction do not modify the data, the second transaction modifies the data, and the first transaction effective time is before the second transaction effective time, executing the actions of the first transaction with respect to data in the first data state stored in the effective change stack.

24. A system for transaction processing, comprising:
a processor; and
a memory coupled with the processor, wherein the memory is configured to provide the processor with instructions which when executed cause the processor to:
receive a first transaction associated with a first system tenant, wherein the first transaction includes a first transaction effective time and a plurality of actions associated with data in a first data state of a plurality of data states stored in an effective change stack associated with the data wherein:
each of the plurality of data states stored in the effective change stack records a modification of the data that is associated with a transaction effective time, wherein recording includes recording initial creation of data with states of attributes and relationships as well as changes to the attributes and relationships of the data through time, wherein the relationship refers to the latest effective change for the data;
order the effective changes of data in descending transaction of transaction time if effective changes of data have the same effective time; and
the first data state is identified at least in part by the first transaction effective time;
determine whether the first transaction modify the data, whether a second transaction is executing that modifies the data associated with the first system tenant, and whether the second transaction has a second transaction effective time after the first transaction effective time; and
in the event that the actions of the first transaction and the second transaction do not both modify the data, executing the actions of the first transaction with respect to the first transaction effective time concurrently with the second transaction, wherein:
in the event that the actions of the first transaction do not modify the data, the second transaction modifies the data, and the first transaction effective time is before the second transaction effective time, execute the actions of the first transaction with respect to data in the first data state stored in the effective change stack.

25. A computer program product for transaction processing, the computer program product being embodied in a non-transitory computer readable medium and comprising computer instructions for:
receiving a first transaction associated with a first system tenant, wherein the first transaction includes a first transaction effective time and a plurality of actions associated with data in a first data state of a plurality of data states stored in an effective change stack associated with the data wherein:
each of the plurality of data states stored in the effective change stack records a modification of the data that is associated with a transaction effective time, wherein recording includes recording initial creation of data with states of attributes and relationships as well as changes to the attributes and relationships of the data through time, wherein the relationship refers to the latest effective change for the data;
ordering the effective changes of data in descending transaction of transaction time if effective changes of data have the same effective time; and
the first data state is identified at least in part by the first transaction effective time;
determining, using a processor, whether the actions of the first transaction modify the data, whether a second transaction is executing that modifies the data associated with the first system tenant, and whether the second transaction has a second transaction effective time after the first transaction effective time; and
in the event that the actions of the first transaction and the second transaction do not both modify the data, executing the actions of the first transaction with respect to the first transaction effective time concurrently with the second transaction, wherein:
in the event that the actions of the first transaction do not modify the data, the second transaction modifies the data, and the first transaction effective time is before the second transaction effective time, executing the actions of the first transaction with respect to data in the first data state stored in the effective change stack.

* * * * *